United States Patent
Terakura et al.

(10) Patent No.: US 6,529,907 B1
(45) Date of Patent: Mar. 4, 2003

(54) SERVICE QUALITY MANAGEMENT SYSTEM

(75) Inventors: Yosuke Terakura, Tokyo (JP); Kei Kato, Tokyo (JP); Hiroshi Nagai, Tokyo (JP)

(73) Assignee: Oki Electric Industry CO Ltd., Tokyo (JP)

( * ) Notice: Subject to any disclaimer, the term of this patent is extended or adjusted under 35 U.S.C. 154(b) by 0 days.

(21) Appl. No.: 09/538,293

(22) Filed: Mar. 29, 2000

(30) Foreign Application Priority Data

May 24, 1999 (JP) .......................................... 11-143100

(51) Int. Cl.[7] .............................................. G06F 17/30
(52) U.S. Cl. ............................. 707/9; 709/229; 709/228
(58) Field of Search ................................ 707/6, 7, 8, 9; 709/223, 224, 225, 226, 227–240

(56) References Cited

U.S. PATENT DOCUMENTS

| | | | | |
|---|---|---|---|---|
| 5,444,705 A | * | 8/1995 | Olnowich et al. | 370/388 |
| 5,787,289 A | * | 7/1998 | Cook et al. | 710/244 |
| 5,870,396 A | * | 2/1999 | Abu-Amara et al. | 370/413 |
| 6,006,264 A | * | 12/1999 | Colby et al. | 709/220 |
| 6,088,356 A | * | 7/2000 | Hendel et al. | 370/392 |
| 6,094,435 A | * | 7/2000 | Hoffman et al. | 370/414 |
| 6,108,307 A | * | 8/2000 | McConnell et al. | 370/235 |
| 6,141,686 A | * | 10/2000 | Jackowski et al. | 709/224 |
| 6,148,336 A | * | 11/2000 | Thomas et al. | 709/223 |
| 6,163,795 A | * | 12/2000 | Kikinis | 709/203 |
| 6,185,601 B1 | * | 2/2001 | Wolff | 709/105 |
| 6,330,603 B1 | * | 12/2001 | Seki et al. | 709/226 |

* cited by examiner

Primary Examiner—Safet Metjahic
Assistant Examiner—Hanh Thai
(74) Attorney, Agent, or Firm—Rabin & Berdo, P.C.

(57) ABSTRACT

A service quality management system which is capable of adaptively controlling a quality of a service provided by a distributed object is provided. The system is provided with a first storage for saving information about a relation between a server for the distributed object and a priority set to services to be provided by the server and a second storage for saving information about a relation between an identifier for communication path under the control of a node and a priority set for processing made on the node. At the time of a request for activation of the server, the priority set to services provided by the server is read out by using priority reading from the first storage and the information about the identifier for communication path corresponding to processing with the same priority as that read from the priority reading device is read out by using an identifier reading device from the second storage. Then, the corresponding server is actually activated by a server activating device and the server is connected to the communication path designated by the identifier read from the identifier reading device.

8 Claims, 7 Drawing Sheets

Fig.3

| ID | PRIORITY |
|---|---|
| 001 | INTERMEDIATE |
| 002 | HIGH |
| 003 | LOW |
| 004 | INTERMEDIATE |
| 005 | INTERMEDIATE |

Fig.4

| PRIORITY | PORT NUMBER |
|---|---|
| HIGH | 3500 ~ 3600 |
| INTERMEDIATE | 3601 ~ 3800 |
| LOW | 3801 ~ 4100 |

Fig.7

| PRIORITY | PORT NUMBER |
|---|---|
| HIGH | 3500 ~ 3550 |
| SLIGHTLY HIGH | 3551 ~ 3600 |
| INTERMEDIATE | 3601 ~ 3800 |
| SLIGHTLY LOW | 3801 ~ 3900 |
| LOW | 3901 ~ 4100 |

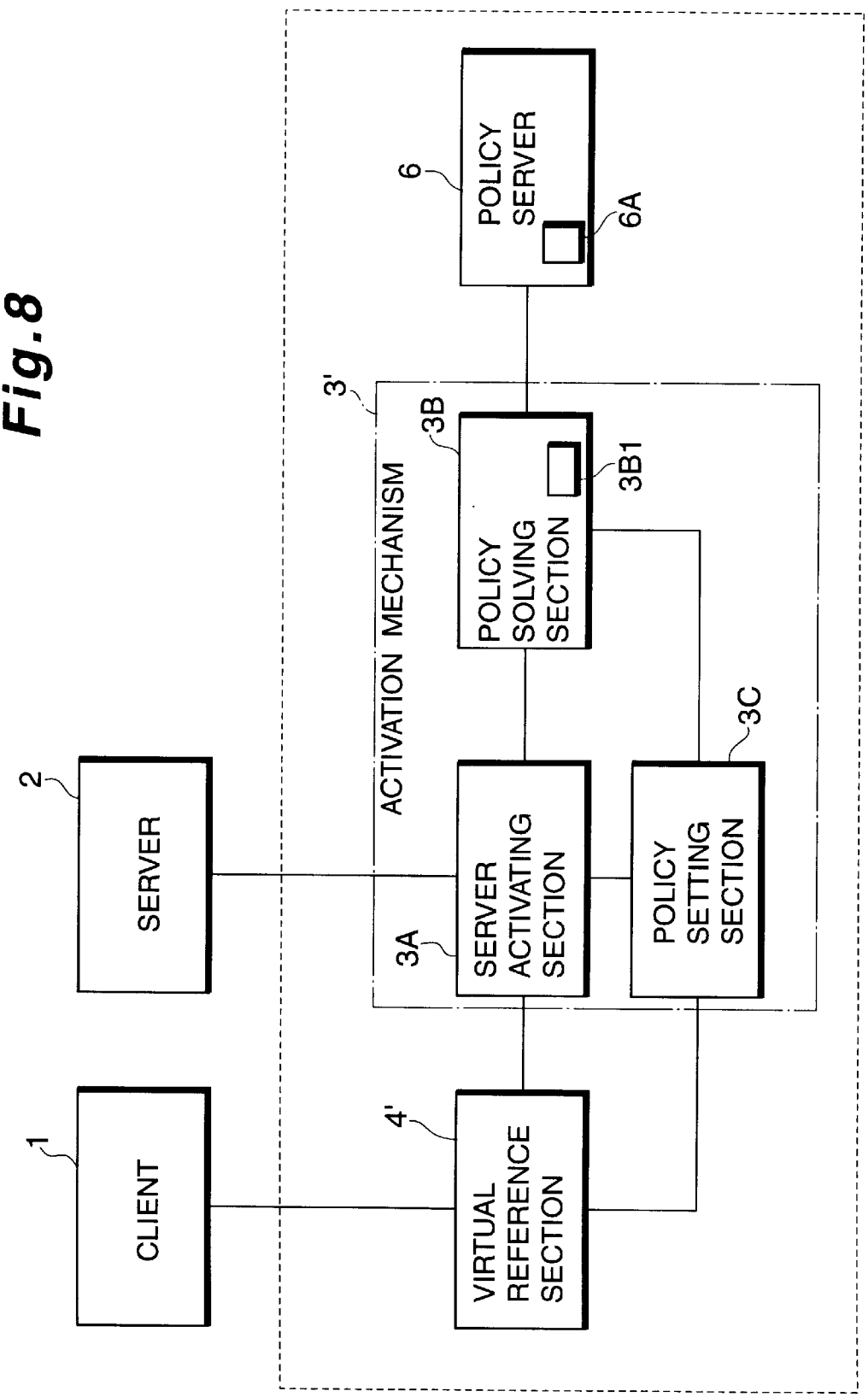

SERVICE QUALITY MANAGEMENT SYSTEM

BACKGROUND OF THE INVENTION

1. Field of the Invention

The present invention relates to management technology of a quality of service provided by a distributed processing system.

2. Description of the Related Art

In a conventional distributed processing system, to economize on computational resources, an operation of a server for distributed object is stopped while the server is not in use and is then re-started when a call is issued by a client. A mechanism to carry out the activation of the server is called an "activation mechanism".

FIG. 2 is a schematic diagram showing the distributed processing system having the activation mechanism. The distributed processing system is mainly composed of the activation mechanism 3 used to allow communications between the client 1 and the server 2 and of a virtual reference section 4.

Procedures by which the activation mechanism 3 and the virtual reference section 4 are operated to activate the server 2 are hereinafter described.

First, in the distributed processing system, a calling request (i.e., a request for the call for operations of methods provided by the server 2) is given by the client 1 to the virtual reference section 4 (see reference number (1) in FIG. 2). When the virtual reference section 4 receives the above request, it checks if there is a real reference 4A internally and, if the real reference exists, the calling request is outputted to the real address space (i.e., an IP address and a port number) of the server 2 saved in the real reference section 4A. If the calling is made successfully, a reply is provided by the server 2, which will be forwarded to the client 1 by the virtual reference section 4.

However, if the call fails due to an absence of server 2 or an unexpected malfunction in server 2, the virtual reference section 4 outputs a request for activating a new server to the activation mechanism 3 so that the server 2 be activated (see (3) in FIG. 2). When the activation mechanism 3 receives the above request, it activates the server 2 in response to the request (see (4) in FIG. 2) and, at the same time, it gives a new real reference 4A storing the real address (i.e., an IP address and a port number) of the server 2 to the virtual reference section 4 (see (5) in FIG. 2). Thus, information required for activating the server 2 (i.e., location from which the server's code will be downloaded, and/or the server's persistent data) is managed by the activation mechanism 3.

When the virtual reference section 4 obtains the new real reference 4A, it, by using this new real reference 4A, outputs the calling requests again to the server 2 (see (6) in FIG. 2). If the call is made successfully, a reply is given from the server 2 to the virtual reference section 4 and the reply is then transferred to the client 1 (see (7)(8) in FIG. 2). After above operations, the client 1 can be in communication with the server 2.

Once the server 2 is activated, it remains activated until it stops for itself or it is instructed to stop by the activation mechanism 3. While the server 2 is in communication with the client 1, a communication path (for example, with an IP address and a port number of TCP/IP [Transmission control protocol/Internet protocol]) assigned at the time of the activation of the server 2 is used. The communication path is assigned by the activation mechanism 3 at the time of activating the server 2. The communication path can either be fixed to a pre-defined path (port number) or be assigned with a path (port number), which is dynamically allotted every time the server is activated.

As described above, the conventional distributed processing system has a problem in that the communication path is assigned statically or randomly regardless to the QoS control mechanism, which is utilized in the network nodes. Therefore, service quality of distributed objects cannot be controlled well.

SUMMARY OF THE INVENTION

In view of the above, it is an object of the present invention to provide a service quality management system which is capable of adaptively controlling the quality of services provided by a distributed object.

According to the first aspect of the present invention, a service quality management system is provided, which includes:

first storage means for saving relations between each of a plurality of servers for distributed objects and a priority defined for services provided by said each server;

second storage means for saving information about relations between an identifier of a communication path under the control of a node and a priority defined for processing performed by the node;

priority reading means for detecting a request for activation of a server and reading a priority defined for a service provided by a corresponding server from the first storage means;

identifier reading means for reading, from the second storage means, the identifier of the communication path corresponding to processing having a priority being equivalent to that read out from the priority reading means; and server activating means for actually activating a corresponding server in accordance with the detected activation request and for connecting the server to a communication path designated by the identifier read by the identifier reading means.

In the foregoing, a preferable mode is one wherein, when a classification of levels of the priority given by the second storage means agrees with that of the priority given by the first storage means, the identifier reading means reads the directly corresponding identifier based on the priority read by the priority reading means.

Also, a preferable mode is one wherein, when a classification of levels of the priority given by the second storage means does not agree with that of the priority given by first storage means, the identifier reading means, based on the priority read by the priority reading means, retrieves a priority given by the second storage means and then reads an identifier corresponding to the priority obtained newly.

Also, a preferable mode is one wherein the identifier designating the communication path is a port number.

Also, a preferable mode is one wherein the identifier designating the communication path is an identifier number of a client.

Also, a preferable mode is one wherein a corresponding relationship between the priority of a service provided by the server for the distributed object saved in the first storage means and each server is able to be changed at any time.

Furthermore, a preferable mode is one wherein the change of the corresponding relationship is instructed by a client.

BRIEF DESCRIPTION OF THE DRAWINGS

The above and other objects, advantages and features of the present invention will be more apparent from the following description taken in conjunction with the accompanying drawings in which:

FIG. 3 is a table showing corresponding relationship between an identification number of a server and a priority of a service provided by the service quality management system according to the first embodiment;

FIG. 4 is a table showing corresponding relationship between a port number and a processing priority according to the first embodiment;

FIG. 7 is a table showing a corresponding relationship between port numbers and processing priority; and FIG. 8 is a schematic functional block diagram of the distributed processing system provided with the service quality management system according to a third embodiment of the present invention.

DETAILED DESCRIPTION OF THE PREFERRED EMBODIMENTS

Best modes of carrying out the present invention will be described in further detail using various embodiments with reference to the accompanying drawings.

First Embodiment

Figure 1:
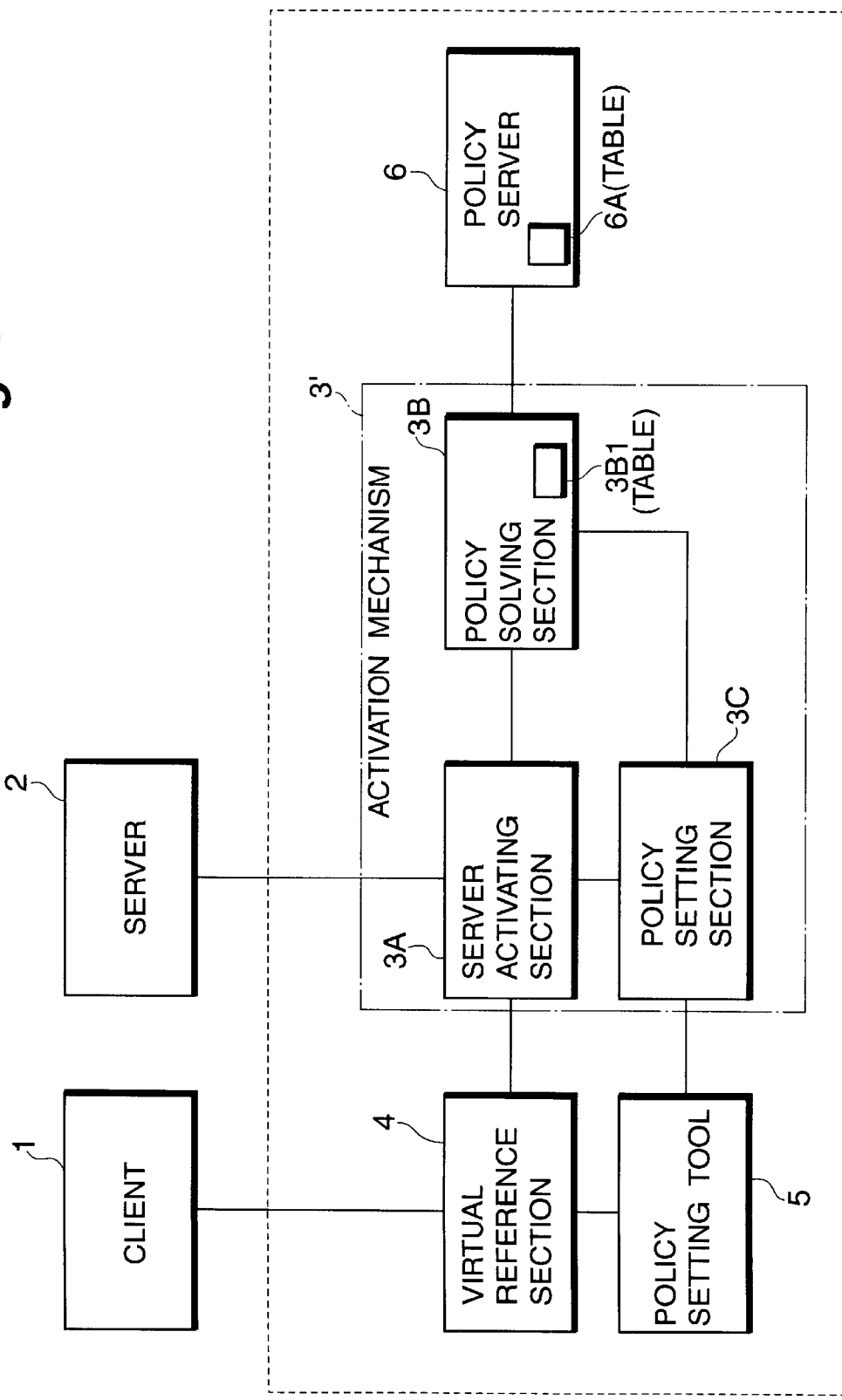
FIG. 1 is a schematic functional block diagram of a distributed processing system provided with a service quality management system according to a first embodiment of the present invention.
Figure 2:
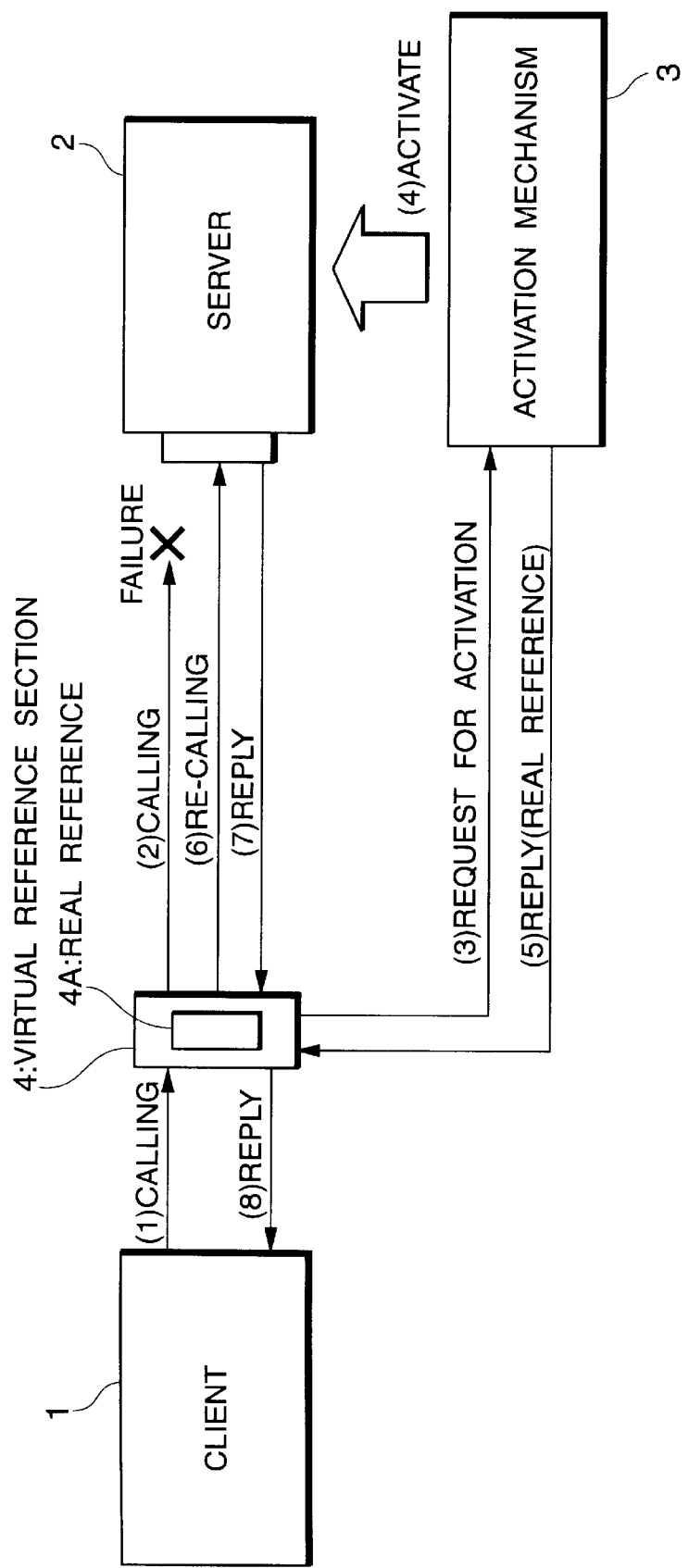
FIG. 2 is a schematic block diagram of a conventional distributed processing system provided with an activation mechanism.

FIG. 1 is a schematic functional block diagram of a service quality management system according to the first embodiment of the present invention. Configurations shown in FIG. 1 do not set any limitation to hardware or software structure of the implementation of the present invention. Same reference numbers in FIG. 1 showing the present invention designate corresponding parts shown in FIG. 2 showing a conventional distributed processing system with an activation mechanism.

As shown in FIG. 1, the service quality management system of this embodiment is comprised of a client 1, a server 2, an activation mechanism 3' which allows communication between the client 1 and the server 2, a virtual reference section 4, a policy setting tool 5 and a policy server 6. Functional sections being specific to this first embodiment are mainly described below.

Referring to FIG. 1, the activation mechanism 3' is composed of a server activating section 3A, a policy solving section 3B and a policy setting section 3C.

The server activating section 3A works in cooperation with the virtual reference section 4 and with the policy solving section 3B. The server activating section 3A, upon receiving a server activation request from the virtual reference section 4, activates the server 2. At this point, the server activating section 3A runs a query to the policy solving section 3B, using an identification number (ID) of the server 2 as a key, to obtain a communication path (a port number in this case) for the server 2. The server activating section 3A, when receiving the communication path (a port number in this case) from the policy solving section 3B, activates the server 2 instructing it to use the communication path (a port number in this case). At the same time, the server activation section 3A gives a real reference 4A that utilizes the communication path to the virtual reference section 4.

The policy solving section 3B works in cooperation with the policy server 6, the server activating section 3A and the policy setting section 3C. The policy solving section 3B has a table 3B1 (see FIG. 3) containing relationships between the identification number (ID) of the server 2 and a priority of the service provided by the server 2. FIG. 3 shows a case where the priority is represented by three levels that are "High", "Intermediate" and "Low".

The policy solving section 3B, when the ID of the server 2 is inputted by the server activating section 3A, refers to the relationship table 3B1 and by using the ID number of the server as a search key, obtains the priority of the server 2. The policy solving section 3B, after obtaining the priority of the server 2 form table 3B1, runs a query to the policy server 6 about a communication path (a port number in this case) that corresponds to the priority. The policy solving section 3B then notifies the server activating section 3A of the port number if one port number is notified by the policy server 6 (including a case where one port number has been selected from two or more port numbers at the time of being informed) or one number selected from two or more port numbers if a plurality of port numbers are informed by the policy server 6.

The policy setting section 3C works in cooperation with the policy solving section 3B and with the policy setting tool 5. The policy setting section 3C sets or amends the priority of a service to be provided by the corresponding server. The set or amended priority will be saved in table 3B1 of the policy solving section 3B.

The policy setting tool 5 sets or amends the table 3B1 through the policy setting section 3C. It is used to change a priority of a server, for example, from "Intermediate" to "High" level or from "High" to "Low" level. Usually, the policy setting tool 5 is operated by a manager of a node. The policy setting tool 5 serves to provide a user interface between the node and its manager.

The policy server 6 is a server used to manage the relationship between communication path (port number in this case) and processing priority by a relationship table 6A (FIG. 4). FIG. 4 is a table showing relationships between communication path (port number in this case) and the processing priority represented by three levels including "High", "Intermediate" and "Low". Thus, according to this embodiment, a classification for differentiating the service priority shown in FIG. 3 agrees with that for differentiating the processing priority shown in FIG. 4. However, because both the priorities are set originally in a separate manner, the two priorities do not always agree with each other. In such a case, these tables must be, in advance, amended so that the classification of the priority shown on the table 3B1 agrees with that of the priority shown on the table 6A.

For example, if the classification of the priority of the processing is composed of 5 levels while the classification of the priority of the service is consisted of 3 levels, a new table 6A is created by reassigning the priority of the process so that it consists of 3 levels or by combining the level partially so that both the classifications are consisted of 3 levels.

Activation operations in the distributing processing system provided with the service quality control device according to this embodiment are hereinafter described. The following description is presented assuming that some of the servers 2 (i.e., 5 servers from (1) to (5)) are already registered in the activation mechanism 3'. The priority of the service corresponding to the server is represented by three levels that are "High", "Intermediate" and "Low". It is also assumed that, at the time of initial setting, in the table 3B1 on the policy solving section 3B, default priority (in this case "Intermediate") is set to each server.

First, operations for changing priorities of services are described. At this point, policy setting tool 5 gives an instruction to the policy setting tool 3C as to how priorities of corresponding servers must be changed ((1) in FIG. 5). The policy setting tool 3C accesses the policy solving section 3B1 in accordance with the instruction of changes and modifies the table 3B1 ((2) in FIG. 5). For example, the priority of the corresponding server 2 (2) (ID=002) is changed to "High" and the priority of the corresponding server 2 (3) (ID=003) is changed to "Low". FIG. 3 shows the content of the table 3B1 after the modification.

By giving different priorities to servers, the activation operation specified in this embodiment becomes effective. The activation operation is started by a request for server activation from the virtual reference section 4 ((4) in FIG. 5). As in the case of the conventional example, the above request is only made when client 1 tries to access the server 2 via virtual reference section 4, but the virtual reference section 4 fails calling the server 2 for some reason. The request for activating the server is given to the server activating section 3A by the virtual reference section 4.

Figure 5:
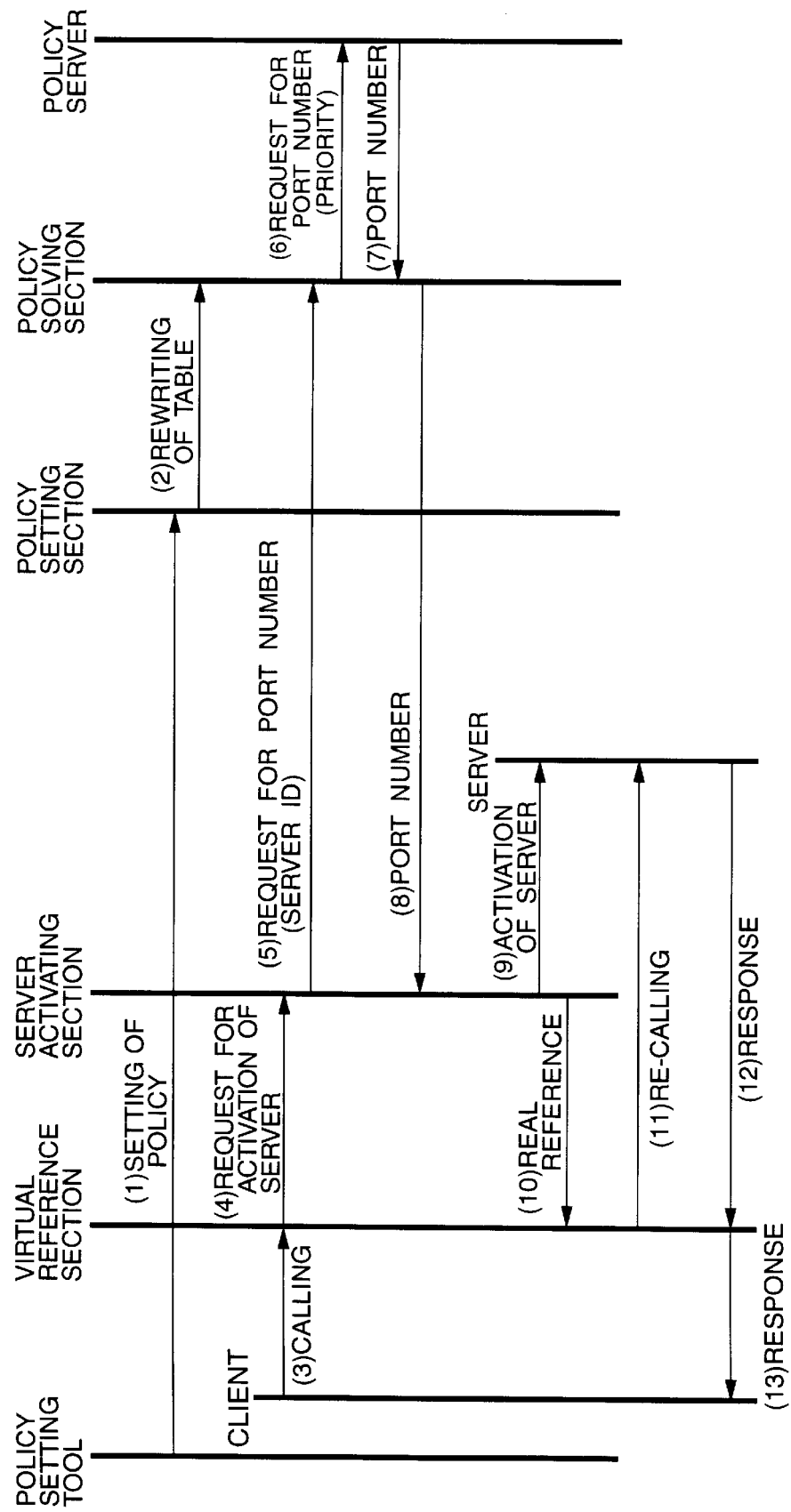
FIG. 5 is a diagram showing execution procedures for activation and its related operations according to the first embodiment.

When receiving the request for server activation, the server activating section 3A gives to the policy solving section 3B, an identification number (ID) of the server of which the activation request has been made ((5) in FIG. 5) and requests for a communication path (port number in this case) for the server 2.

The policy solving section 3B refers to the table 3B1 shown in FIG. 3 and reads the priority corresponding to the required server 2. For example, if the server 2 (2) (ID=002) is an object of the calling, the priority "High" is obtained. Next, the policy solving section 3B makes a request for a communication path (a port number in this case) corresponding to the priority "High" to the external policy server 6 ((6) in FIG. 5). If the table 6A held by the policy server 6 is as shown in FIG. 4, the policy server 6 will return an object indicating a range from 3500 to 3600 (or it may return a single value within 3500 to 3600) ((7) in. FIG. 5). Then, if an object with a range is returned, the policy solving section 3A selects an appropriate port number out of 3500 to 3600 and returns the selected port number to the server activating section 3A ((8) in FIG. 5). If the policy server 6 returned a single value, then the policy solving section 3A simply returns the value to the server activating section 3A ((8) in FIG. 5).

The server activating section 3A then activates the server 2 and have this server 2 (2) connected to the communication path (a port number in this case) returned by the policy solving section 3B ((9) in FIG. 5). At this point, the server activating section 3A, while having the server 2 connected to the returned communication path (a port number in this case), gives the virtual reference section 4 a real reference that utilizes the communication path ((10) in FIG. 5).

The virtual reference section 4, when obtaining the new real reference, tries re-calling the server by using the new real reference ((11) in FIG. 5). If the re-calling is successful, the response is given by the server 2(2) to the virtual reference section 4 and is transferred to the client 1 ((12) (13) in FIG. 5). By above operations, communication between the client 1 and the server 2 (2) is established.

As described above, according to the first embodiment, when activation of a server is requested, firstly by verifying the priority set to the server the activation of which is requested and then by allowing the server to be connected to a communication path (a port number in this case) corresponding to the verified priority, a matching between the server and the communication path can be adaptively achieved in accordance with the requested priority.

The above configurations allow the server with a high priority to be connected to a communication path (a port number in this case) with a high priority at nodes on a network and the server with an ordinary priority to be connected to a communication path (a port number in this case) with an ordinary priority at nodes on the network and further the server with a low priority to be connected to a communication path (a port number in this case) with a low priority at nodes on the network.

This enables the quality of service (QoS) of a distributed object server to be in accordance with the quality of service on the network. Therefore, the control of both the Qos on the network and the QoS of the distributed object service can be achieved simultaneously.

Second Embodiment

Figure 6:
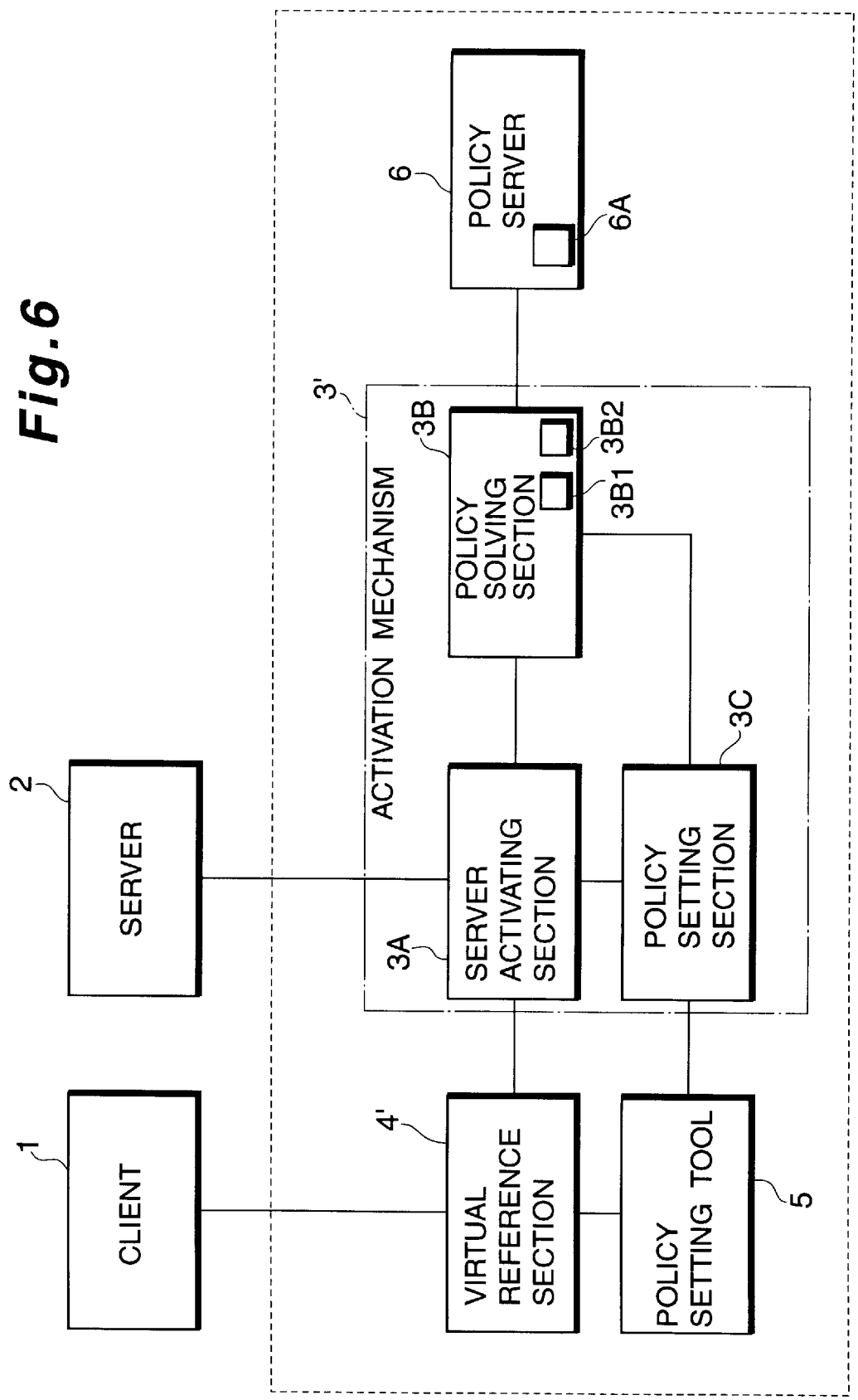
FIG. 6 is a schematic functional block diagram of the distributed processing system provided with the service quality management system according to a second embodiment of the present invention.

FIG. 6 is a schematic functional block diagram of the distributed processing system provided with the service quality management system according to a second embodiment of the present invention. Configurations shown in FIG. 6 do not set any limitation to hardware or software structures of the implementation of the present invention. Same reference numbers in FIG. 6 designate corresponding parts shown in FIG. 1.

The configurations of the second embodiment differ from those of the first embodiment in that, when a classification for differentiating the service priority does not agree with that for differentiating the processing priority, the corresponding relationship table is not amended in advance. Unlike in the case of the first embodiment, the difficulty caused by the differences in the classification is overcome by separately introducing a priority associating means.

A method for overcoming the above problem by using the priority associating means is described below, presuming that three levels of the priority are designated in table 3B1 and five levels of the priority are designated in table 6A. FIG. 7 shows one example of the corresponding relationship table 6A. In the description of this second embodiment, it is presumed that the number of levels in classification for differentiating processing priority is larger that that for differentiating service priority. However, a same effect can be obtained even in the case opposite to this.

According to the second embodiment, as a means to associate the corresponding relationship table 3B1 with the table 6A, the priority associating section 3B2 is mounted on the policy solving section 3B (see FIG. 6). The priority associating section 3B2 is a means used to designate a processing priority corresponding to the service priority based on the preliminarily set rules. The following is an example of such priority associating. The "High" level in the service priority is associated with the "High" in the processing priority and the "Intermediate" level in the service priority is associated with a "Slightly High", "Intermediate" and "Slightly Low" levels and further the "Low" level in the service priority is associated with a "Low" level.

Thus, if the activation of the server having the "High" service priority is requested, communication path (a port number in this case) with the "High" processing priority associated with can be read, while, if the activation of the server having the "Low" service priority is requested, communication path (a port number in this case) with the "Low" processing priority associated with can be read. Moreover, if the activation of the server having the "Intermediate" service priority is requested, communication path (a port number in this case) with "Slightly High", "Intermediate" or "Slightly Low" processing priority associated with can be read. The same effects obtained in the first embodiment can be achieved accordingly. In the second embodiment, though the means used to associate the priority in the corresponding relationship table 3B1 with that in the table 6A is mounted on the policy solving section 3B, this may be mounted in the policy server 6 or may be externally mounted in an independent manner.

Third Embodiment

FIG. 8 is a schematic functional block diagram of the distributed processing system provided with the service quality management system according to a third embodiment of the present invention. Configurations shown in FIG. 8 do not set any limitation to hardware or software structures of the implementation of the present invention. Same reference numbers in FIG. 8 designate corresponding parts shown in FIG. 1.

Configurations of the third embodiment differ from those of the first embodiment in that functions of the policy setting tool 5 shown in FIG. 1 is implemented in the virtual reference section 4'. That is, according to this third embodiment, unlike in the case of the first embodiment, client 1 can request the virtual reference section 4' to set or amend priority of a server in table 3B1.

Therefore, though the activation operations in the third embodiment are the same as those in the first embodiment, in the third embodiment, the setting of the priority in the corresponding relationship table 3B1 is started in a client-led manner and the same effects obtained in the first embodiment can be achieved as well.

As described above, in the service quality management system of the present invention, at the time when the server is activated, the server will be assigned a communication path that has the same priority as the server's priority. Therefore, the quality of service (QoS) of a distributed object server can be controlled uniformly.

It is apparent that the present invention is not limited to the above embodiments but may be changed and modified without departing from the scope and spirit of the invention. For example, in the embodiments described above, it is presumed that five servers 2(1) to 2(5) are registered in the activation mechanism 3', however, the number of registered servers is not limited to five. Moreover, in the above embodiments, the levels of the server priority and the priority of the nodes on the network are set to 3, however, the levels to be set is not limited to 3.

Furthermore, in the above embodiments, the system is so configured that a query about the communication path (a port number in this case) is made to the policy server 6. However, it may be so configured that a function to obtain the communication path from the identification number (ID) of the server may be incorporated in the policy solving section 3B. Hence, the communication path (a port number in this case) can be resolved within the policy solving section 3B. For example, the table 6A showing the relations between communication path and the priority may be mounted in the policy solving section 3B.

Also, in the above embodiments, the client-server type network system in which the functional relation between the client and the server is fixed is described, however, the present invention may be applied to a peer-to-peer type network system in which roles of the client and the server are changed at every moment.

Additionally, in the above embodiments, the port number is used as an "identifier of a communication path". However, any identifier may be applicable so long as it can be used to distinguish a communication path with another.

What is claimed is:

1. A service quality management system comprising:
   first storage means for saving information about a relation between each of a plurality of servers for distributed objects and a priority defined for each said server, the priority being selected from a set of priorities;
   second storage means for saving information about relationships between identifiers of communication paths under the control of a node and priorities defined for processing performed by said node;
   priority reading means for detecting a request for activation of one of said servers and reading a priority defined for said one of said servers from said first storage means;
   identifier reading means for reading, from said second storage means, an identifier of a communication path corresponding to processing having a priority equivalent to the priority read out from said priority reading means for said one of said servers; and
   server activating means for actually activating said one of said servers in accordance with said detected activation request and for connecting said one of said servers to a communication path designated by said identifier read by said identifier reading means.

2. The service quality management system according to claim 1, wherein, when a classification of levels of said priority given by said second storage means agrees with that of said priority given by said first storage means, said identifier reading means reads a directly corresponding identifier based on said priority read by said priority reading means.

3. The service quality management system according to claim 1, wherein, when a classification of levels of said priority given by said second storage means does not agree with that of said priority given by first storage means, said identifier reading means, based on the priority read by said priority reading means, retrieves a priority given by said second storage means and then reads an identifier corresponding to the priority obtained newly.

4. The service quality management system according to claim 1, wherein sad identifier designating said communication path is a port number.

5. The service quality management system according to claim 1, wherein said identifier designating said communication path is an identifier number of a client.

6. The service quality management system according to claim 1, wherein the relationships between the servers and the priorities of service provided by servers saved in said first storage means is able to be changed at any time.

7. The service quality management system according to claim 6, wherein a change in the priority of service provided by a server is instructed by a client.

8. The service quality management system according to claim 1, further comprising virtual reference means for outputting a real reference to a server in response to a request from a client, if a real reference exists in said virtual reference means, and otherwise for obtaining a new real reference to another server, said virtual reference means communicating with said server activating means, said virtual reference means additionally comprising means for modifying the priority stored in said first storage means for a server in response to a request from the client.

* * * * *